June 7, 1955 L. C. PEMBERTON 2,710,184
SPRING SUSPENSION DEVICES FOR MOTOR VEHICLES
Filed March 10, 1951 2 Sheets-Sheet 1
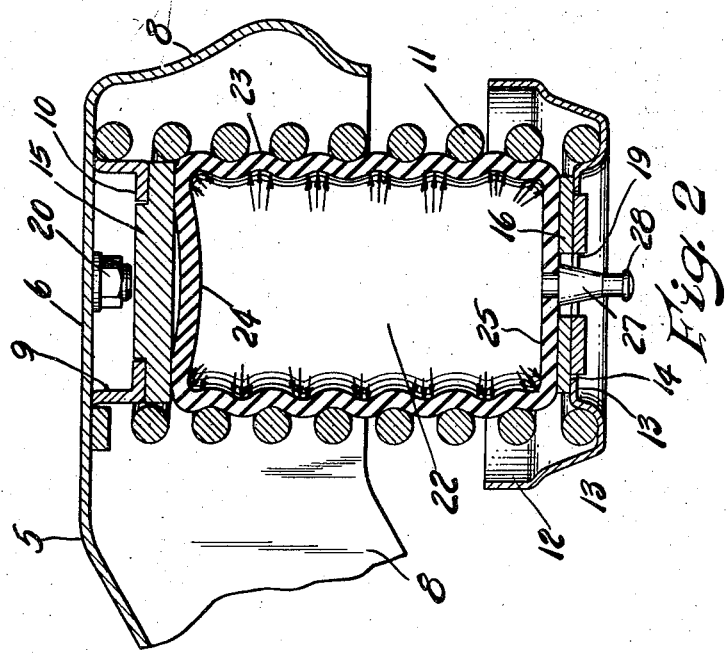
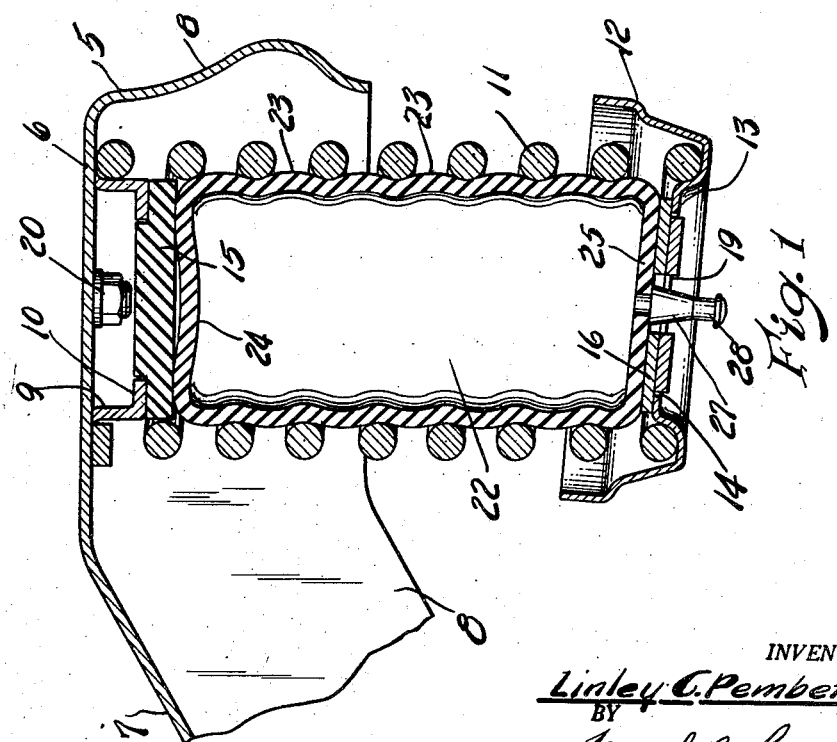
INVENTOR.
Linley C. Pemberton
BY
Frank C. Farman
ATTORNEY June 7, 1955 L. C. PEMBERTON 2,710,184
SPRING SUSPENSION DEVICES FOR MOTOR VEHICLES
Filed March 10, 1951 2 Sheets-Sheet 2

INVENTOR.
Linley C. Pemberton
BY
Frank C. Fearman
ATTORNEY

United States Patent Office 2,710,184
Patented June 7, 1955

2,710,184

SPRING SUSPENSION DEVICES FOR MOTOR VEHICLES

Linley C. Pemberton, Lansing, Mich., assignor, by mesne assignments, to Universal Air Lift, Inc., Lansing, Mich.

Application March 10, 1951, Serial No. 214,862

6 Claims. (Cl. 267—34)

The present invention relates to spring suspension devices for motor vehicles, and more particularly to a compound spring device of the pneumatic type which can be installed in the spring suspension system of present-day motor vehicles to increase the roadability thereof and enable the vehicle body to be loaded beyond the maximum load limit without damaging the conventional spring suspension equipment.

One object is to provide a compound spring suspension device for motor vehicles which can be quickly and conveniently installed in a variety of different spring suspension systems of present-day motor vehicles to enable the vehicle body to support loads such as imposed thereon by attaching a trailer, or other overloads imposed on the front or rear springs of vehicles.

Another object is to provide pneumatic means which can be easily and quickly installed in the coil spring of a vehicle spring suspension system or the like to enable the vehicle body to support and carry overloads, eliminate either and/or both front end and rear end sag, and by means of which uneven overloads may be balanced.

A further object is to provide a pneumatic device which can be quickly and conveniently installed in coil spring vehicle spring suspension systems or the like to restore the coil spring units which have been subjected to creep and have approached their endurance limit such as to permanently "set" the coil springs beyond their efficient use and purpose for which they are intended.

Another object is to provide a compound coil spring and pneumatic suspension device which can be quickly and easily installed between the leaf spring and chassis of present-day motor vehicle running gear to boost the leaf spring suspension device of the vehicle and enable the vehicle body to be loaded beyond its conventional maximum limit without damaging or impairing the properties of the leaf spring and causing the same to be deformed beyond its endurance limit and which protects the vehicle frame and suspension system from bottoming.

Another object is to provide a pneumatic device including a gas or air-filled envelope formed of resilient material either natural or synthetic, which can be quickly and conveniently installed in the coil springs of spring suspension systems on conventional vehicles to restore or boost coil springs which have been subjected to long time yielding through extensive use, and have thus approached their endurance limit and caused the front end of the vehicle to sag to a dangerously low position.

The coil springs of present-day suspension devices are subjected to deforming stresses which are continual and sustained by the weight of the vehicle body during standstill, as well as by successive torsional strains during vehicle use. These stresses and strains over a long period of time during the life of the vehicle cause the metal to "set" and assume a permanent set. As this occurs, the front of the vehicle sags, which necessitates replacement of the coil springs and a costly repair to the front end suspension.

Another object is to provide a cylindrical gas or air filled envelope formed of natural or synthetic rubber or other resilient material which will withstand extreme weather conditions and the action of air and moisture without causing deterioration when installed in present-day vehicle spring suspension systems and subjected to such weather conditions.

Another object is to provide a closed gas or air filled envelope of cylindrical shape and formed of resilient material which, when installed or mounted within the coil spring of a knee action vehicle suspension system, can be inflated to any desired pressure to restore the vehicle body to its original position caused by overloading or which has caused the spring to approach its limit of endurance.

Another object is to provide a pneumatic device of the above-mentioned type which can be inflated to restore the position of the vehicle body having permanently set springs produced through creep or to restore the body of a vehicle to its normal position after the same has been subjected to or while it is being subjected to overloading through increased weight imposed on the body such as by the attachment of trailers or by the loading of the body by other means beyond its maximum load limit.

Another object is to provide a resilient envelope of cylindrical shape and of a diameter to fit within the convolutions of the coil springs, either front or rear suspension system of present-day motor vehicles, to provide a compound spring suspension device which can be easily installed in a variety of different spring suspension systems, and to provide an inflating valve on the cylindrical envelope to enable the same to be inflated after installation to various pressures, depending upon the condition of the vehicle springs and the overloading to which the vehicle body is subjected.

Other objects and advantages of the invention will become apparent during the course of the following description of the accompanying drawings wherein:

Figure 1 is a fragmentary, vertical, cross-sectional view of a spring suspension for conventional motor vehicles as used in connection with front end assemblies having a knee action suspension unit, the air filled, flexible or resilient container or envelope being likewise shown in section and arranged within the convolutions of the coil spring during non-compression thereof.

Figure 2 is a vertical, cross-sectional view through a conventional motor vehicle knee action suspension system similar to Figure 1, but showing the coil spring compressed and the manner in which the air-filled envelope or container is yieldingly urged radially between the coil spring convolutions when the coil spring is compressed, the numerous arrows indicating the pressure lines under inflation.

Figure 3:
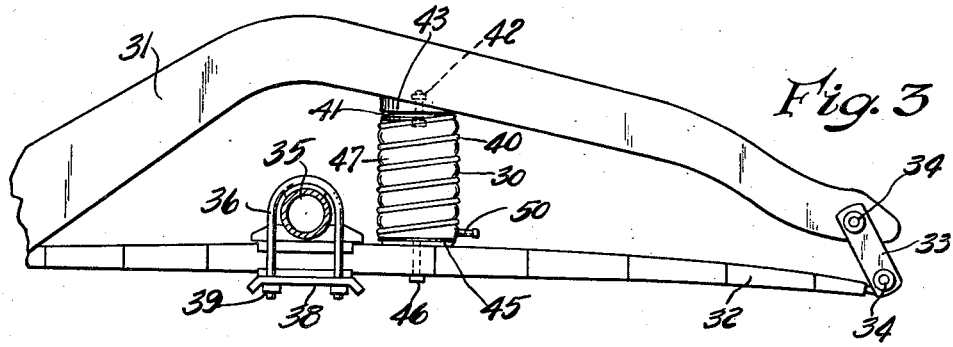
Figure 3 is a fragmentary, side elevational view of a modified form of the invention showing the compound pneumatic and coil spring booster interposed between the chassis frame of a vehicle and one of the leaf springs of the suspension system.
Figure 5:
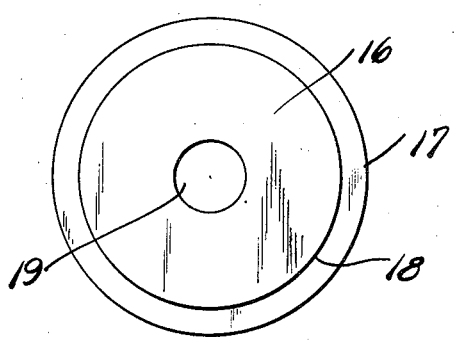
Figure 5 is a top, plan view of an insert which is adapted to be used in the installation shown in Figures 1 and 2 to shield and retain the upper and lower ends of the gas or air filled envelope and to protect the ends from sharp metal edges of the assembly.
Figure 7:
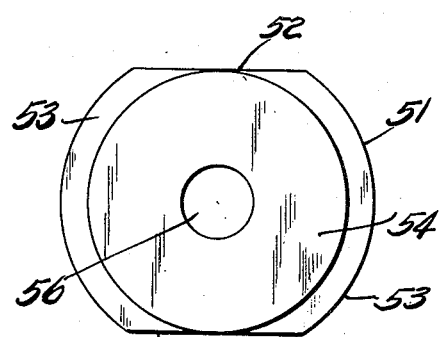
Figure 6:
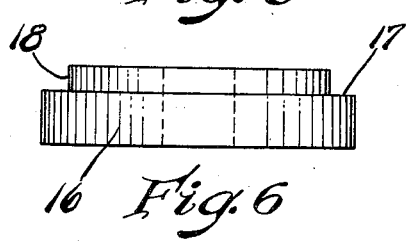
Figure 6 is an edge elevational view of the insert showing the reduced portion for being received in an opening in the spring assembly.
Figure 8:
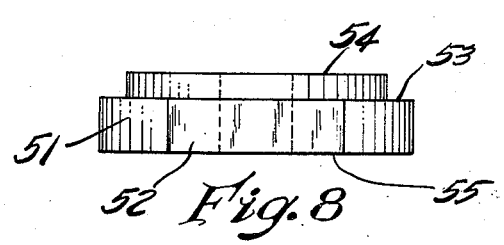

Figure 7 is a top, elevational view of another type of insert similar to that shown in Figure 5, said insert being used in connection with the form of the invention shown in Figure 3 where the end convolutions of the coil spring are smaller in diameter than the intermediate convolutions, and, Figure 8 is a side elevational view of the insert shown in Figure 7 showing the manner in which the same is used in connection with the installation shown in Figure 3.

In present-day motor vehicles including trucks and passenger cars in general, the spring assembly includes either a coil spring for the front and rear suspension, or a coil spring for the front suspension and leaf springs for the rear suspension. Through constant loading, such as the weight of the vehicle body, the payload carried and/or the carrying of passengers, the springs over a period of years receive a permanent set and no longer resume their initial position. Hence, the stressing of the metal springs for long periods of time, even with loads well under the elastic limit, will cause the spring metal to slowly and perceptively yield. This manner of long time yielding is known as "set," and the amount of "set" yielding for a given spring metal is a function of the load and of the length of time of the application of the load. As the spring metal experiences the vehicle load, including the body, motor and parts over long time periods the springs will have a natural propensity to collapse, thus causing either the front or rear end of the vehicle to sag and decreasing the safety and roadability of the vehicle.

A similar condition as the one above will exist upon overloading of the vehicle for long time periods until the endurance limit of the spring metal is approached. While all spring metals have a lower endurance than the yield point, the springs of the vehicle, upon constant overloading, react in substantially the same manner and receive a permanent "set." If the overloading is carried out for long periods of time, the elastic limit will be passed and failure through spring breakage will occur at some local point in the spring produced by a scratch or notch accidentally made on the spring by a workman's tool or the like.

The present invention, when applied to a new or relatively new vehicle, will eliminate any sagging caused by overloads etc., and where sagging of the front or rear ends of the vehicle caused by the permanent setting previously referred to has already occurred, it will restore the vehicle body to its normal position. In addition, the invention provides for the installation of a modified form of the invention on the rear leaf spring suspension assemblies of vehicles so that the rear of the motor vehicle will support loads greater than the maximum vehicle loading, and will enable the use of trailers and the attachment thereof to the rear of the vehicle without causing the vehicle body to be depressed beyond a normal position. Thus, by inflating the air envelope or container with various pressures, the height of the vehicle relative to the ground may be nicely regulated, even though the vehicle is loaded beyond its load carrying capacity.

In the drawings, attention is directed to Figures 1, 2, 5 and 6, wherein there is shown, for the purpose of convenience of illustration, a portion of a motor vehicle front end spring suspension of the knee action type. The front end spring assembly is generally designated 5, and includes a pressed metal chassis frame bracket which extends transversely of the chassis frame, having end portions 6 which extend beyond the chassis side frame members (not shown), and is provided with a central portion 7 to provide a cradle for supporting the front end of the vehicle motor (likewise not shown). The metal bracket 6 is shaped to provide depending side flange portions 8, and the upper portion of the metal bracket 6 is depressed to provide an annular spring support 9 having an inwardly directed flange 10. The coil spring 11 of the front end suspension assembly has its upper end or convolution encircling the annular spring supporting seat 9, while its lower end is received in a pressed metal cup 12 having an inwardly and upwardly extending flange 13 providing a central opening 14.

The pressed metal cup member 12 is connected to the pivoted levers of the knee with the inner end of the levers (not shown) pivoted to the bracket side walls 8, while the other ends or outer portions are pivoted to the steering knuckle bearing bracket. The above knee action type spring suspension is employed in conventional motor vehicles for supporting the front end thereof, and it will suffice to say that road shocks caused by the front vehicle wheels traveling over uneven ground will be transmitted to the coil spring 11 through the knee action lever system. When the front vehicle wheels strike an object, the springs 11 are compressed as shown in Figure 2, and when the springs 11 are subjected to loads over a period of years, they become permanently "set" as shown in Figure 2 and fail to assume their normal position as shown in Figure 1. This results in the so-called sagging of the vehicle body and the spring will not restore the body to its normal position.

Inserts 15 and 16 are mounted within the opening formed by the inwardly extending flange 10 and the opening 14 in the upwardly and inwardly extending flange 13 of the pressed metal cup 12. The inserts 15 and 16 are preferably formed of a molded fiber and rubber composition and include a disk-shaped portion of a diameter larger than the diameter of the openings in the flanges 10 and 13, but smaller than the inner internal diameter of the coil spring convolutions 11. The disk-shaped inserts 15 are cut away along one radial face as at 17 to form a shoulder with a reduced annular portion 18. A central opening 19 is provided in the disk-shaped inserts 15 and 16 for accommodating projecting bolts and the like at the upper end, and the air valve of the inflatable envelope at the lower end.

While I have shown the insert 15 as not being provided with an opening, in certain installations it may be necessary to employ an insert 16 as used in the lower portion of the assembly to accommodate structural parts or fastener elements 20 of increased length used for holding various parts of the knee action assembly together. However, in either case, the cut away portion 17 and annular portion 18 are received in the openings in the inwardly directed flanges 10 and 13 with the annular portion 18 projecting upwardly in the flange 10 and downwardly in the opening 14 in the flange 13. Thus, relatively smooth upper and lower surfaces are provided for the gas or air filled envelope which will be presently described.

After the inserts 15 and 16 have been placed in position by jacking the vehicle body to cause the spring convolutions 11 to separate, a yieldable envelope or container 22 is inserted within the convolutions of the coil spring 11 by deflating the envelope and inserting it between a pair of adjacent coil spring convolutions 11, or through opening 14 in flange 13 prior to installation of insert 16. The container or envelope 22 is formed of a cylinder having walls of uniform thickness molded from any satisfactory resilient material as at 23, and if desired, a synthetic rubber such as butyl, neoprene or other synthetic rubbers, including butadiene, which will resist air and moisture, conditions to which the envelope will be subjected when installed, may be employed.

The resilient container or envelope 22 has its cylindrical wall 23 formed so that the diameter is such as to permit the cylinder to be received within the convolutions of the spring 11, and the upper and lower walls 24 and 25 of the envelope or container 22 are formed integral with the cylindrical wall 23, and when the container is installed, the upper wall abuts the insert 15 and the lower wall 25 abuts the insert 16. The lower wall 25 is provided with an air valve 27 of the Schrader type having a cap 28.

After the inflatable container 22 has been inserted between the convolutions of the spring 11 with the inflating valve 27 projecting through the opening 19, it may be inflated with air through the valve 27 by the use of a conventional air nozzle and supply in a manner similar to the inflation of a tire. Inflation of the envelope or bag 22 causes longitudinal and radial expansion of the envelope whereupon the side walls of the envelope assume an undulating configuration comprising nodes which project a substantial distance between convolutions of the spring 11, the convolutions themselves being received in the roots of the undulating side walls as shown in Figures 1 and 2. The protruding nodes of the envelope side walls form yieldable supporting areas for individual convolutions of the spring 11. The envelope or container 22 may be inflated until the spring 11 has been extended longitudinally or axially to restore the position of the vehicle body and eliminate the sag. In view of the fact that the envelope or container 22 is inflated with a compressible medium the combined action of the spring 11 and the compressible medium in the yielding and flexible envelope 22 will produce a compound spring suspension for the front end of the vehicle which will be smooth in operation and will greatly enhance the roadability of the vehicle.

In the modified form of the invention shown in Figure 3, there is shown a compound coil spring and pneumatic spring booster generally designated 30 which is adapted to be installed between the rear portion of the side channel chassis members 31 and the leaf springs 32. The ends of the leaf spring 32 are connected to the chassis side frame members 31 by shackle clips 33 and shackle bolts 34 as usual. The rear axle 35 is fastened to the leaf spring 32 by means of a U-bolt 36 arranged one on either side of the spring and held in place by a clamping plate 38 and retaining nuts 39.

The compound coil spring and pneumatic booster 30 includes a coil spring 40 having its end convolutions reduced in diameter for receiving a cup-shaped metal stamping of disk-like form as at 41 which is bolted to the side chassis frame members 31 by bolts or other fastening members 42. A wedge-shaped block 43 is interposed between the cup-shaped member 41 and the chassis 31 is provided with an opening for receiving the threaded fastener or bolt 42. The lower end of the coil spring 40 likewise has its lower convolution reduced for receiving a plate-like fastener 45 which is clamped to the leaf spring 32 by means of bolts arranged one on either side of the leaf spring and held in place by a clamping plate as at 46.

Encircled by the coil spring 40 and mounted within the convolutions thereof is a yielding flexible envelope or container 47 which is cylindrical in shape and is formed with closed end walls integrated with the cylindrical wall to form a closed air-tight envelope or container. An inflating valve 50 is mounted in the lower end (or elsewhere) of the envelope or container 47 in the peripheral wall thereof to accommodate the nozzle and air supply during inflation. The envelope or container 47 is formed of a flexible material such as rubber or synthetic rubber of the neoprene, butyl or butadiene type which is extremely flexible, but yet durable, and when subjected to air and water or moisture will withstand exposure without being damaged.

Interposed between the end walls of the yielding flexible envelope or container 47 is a disk-shaped insert (Figs. 7 and 8) including a disk-like body portion 51 having diametrically flattened portions 52 and a cut away portion 53 to produce a reduced section 54. The section 54 is of a diameter small enough to project through the reduced end convolutions of the coil spring 40 and engage the metal retaining cups 41 and 45, while the cut away portions 52 permit the insert 51 to be seated within the next to the last spiral convolution at each end of the coil spring 40. The inserts 51 are formed of a molded fiber and rubber composition so that the faces 55 will present a smooth surface to the end walls of the yielding flexible envelope or container 47 and thus prevent damage thereto through contactual engagement. Openings 56 are provided in the central portion of the insert 51 to accommodate the heads of the threaded fasteners 42 and 46.

In use, the compound coil spring and pneumatic booster 30 is inserted between the chassis frame and the leaf spring 31—32 respectively, and the yielding flexible envelope or container 47 is inflated with air under pressure to restore the vehicle body to its normal relative ground position. When the envelope 47 is inflated it assumes an undulating configuration similar to, and for the same purposes as, the envelope 22 shown in Figures 1 and 2. In the use of trailers where the front end of the trailer is usually coupled to the rear of the vehicle, the device will be found to be advantageous due to the fact that a portion of the load will be placed on the inflated compound pneumatic coil spring assembly 30 and the vehicle body will not sag or will be caused to reduce its sag in the rear. Thus, by inflating the yieldable flexible container 47, the rear of the body may be restored to its normal position while supporting the added load imposed by the trailer. The compound pneumatic coil assembly 30 may be also used in connection with panel body trucks which are usually subjected to overloading, although intended primarily for light delivery.

Figure 4:
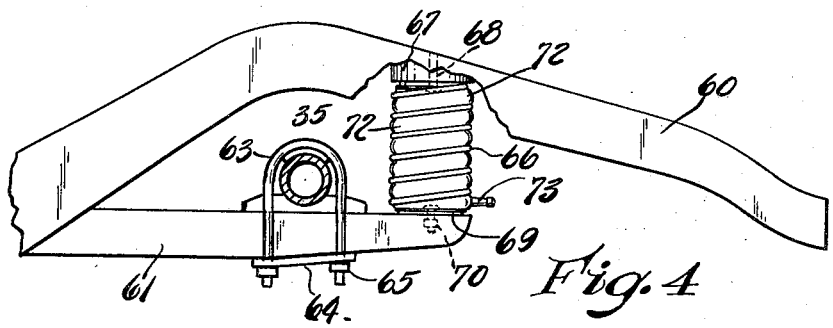
Figure 4 is a fragmentary, side elevational view of another modified form of the invention as applied to a coil and lever type of spring suspension for motor vehicles.

In the modified form of the invention shown in Figure 4, the invention is applied to a typical motor vehicle in which the rear suspension is accomplished by means of a coil spring interposed between the chassis and the axle lever. In this form of the invention, the chassis side frame members 60 are curved as usual and forwardly of the curved portion there is pivoted an axle lever 61 to which is attached an axle housing 62 by means of U-bolts 63, clamping plates 64 and retaining nuts 65. The free end of the suspension lever 61 is sustained by a coil spring 66 which has its upper end fastened to a wedge block 67 bolted to the chassis frame as at 68. Similarly, the lower end of the coil spring 66 is provided with a fastener plate 69 which is bolted to the free end of the suspension 61 as at 70, and this, of course, applies also to the other variations of coil spring design of rear suspension.

Shields or insert blocks 51 are inserted between the convolutions of the coil springs 66 so that one will be placed in engagement with the upper block 67, and the lower clamping plate 69 as pointed out in connection with the form of the invention shown in Figure 3. After the insert disks 51 have been installed, a flexible synthetic rubber envelope 72 is compressed and inserted between the convolutions of the coil spring 66, while the convolutions are separated by jacking the vehicle body and chassis frame 60. The flexible yieldable envelope or container 72 is likewise formed of a suitable resilient material such as rubber, and includes a cylinder having end walls to form a closed air-tight envelope or container. After the envelope or container 72 has been manipulated to properly position the cylindrical wall portion within the convolutions of the coil spring 66, it is inflated through the air valve 73, which is mounted in the lower portion of the container or envelope and arranged to project radially between one or more end convolutions of the coil spring 66.

When the yieldable flexible rubber envelope 72 is inflated as before, it operates in a manner identical to the inflated envelopes 22 and 47 and, therefore, the coil spring 66 will be restored and the body will be elevated to its normal position. In spring suspension assemblies as typically shown in Fig. 4, the coil spring 66 becomes pre-set after a period of long usage in the manner as pointed out in connection with the form of the invention shown in Figures 1 and 2, and when the envelope or container 72 is inflated to the desired air pressure, the spring 66 will be restored and the air-filled envelope 72 will sustain, in a compound manner with the spring 66, the vehicle load imposed on the frame 60.

It is to be noted that in the form of the invention shown in Figures 1, 2 and 4, the rubber envelope 23—72 is inserted into position between a pair of adjacent convolutions by completely deflating the envelope and passing it in a contracted position through the adjacent coil spring convolutions when the vehicle body is raised or elevated by a jack (not shown) to cause the convolutions of the coil spring 11—66 to separate a considerable distance, or by inserting through existing openings in the spring supporting cups. Thus, in both forms of the invention (1, 2 and 4), the flexible, yieldable envelope 23—72 is inserted and positioned without necessitating dismantling of the suspension spring assembly, other than by permitting the coil spring to exand when the vehicle body is jacked or elevated to permit the insertion of the contracted flexible, yieldable envelope or container 72.

What I claim is:

1. In a spring booster for knee action type vehicle suspension assemblies having a helical coil spring mounted between a coil spring supporting bracket on the chassis frame and one of the movable axle supporting members of the knee action suspension assembly, an elastic cylindrical container having resilient end walls mounted within said coil spring, individual disk-like inserts freely insertable through the convolution of said spring mounted at each end of the cylindrical container and having reduced portions adapted to be received in openings in the spring supporting bracket and movable axle supporting member, and an inflating valve in the lower flexible wall of said container arranged to project through aligned openings in the lowermost insert and axle supporting member, said cylindrical container having a cylindrical shape of substantially the same diameter as the internal diameter of the coil spring.

2. In a spring booster for knee action type vehicle suspension assemblies including a coil spring mounted between a spring supporting bracket on the vehicle chassis and a movable axle supporting member, a flexible yielding container having resilient end walls and being formed of resilient material, individual composition inserts freely insertable through the convolutions of said spring mounted in the spring supporting bracket and movable axle supporting member to provide seats for the flexible end walls of said container, and an inflating valve in the lower end of said container projecting through aligned openings in its corresponding seat and movable axle supporting member.

3. A spring suspension unit adapted to extend between two spaced, relatively movable members so as yieldably to maintain said members in spaced relation, said unit comprising a coil spring; an inflatable bag having elastic side walls of substantially uniform thickness disposed within said coil spring; and means for inflating said bag with a compressible fluid medium, said bag being inflated to expand the side walls of said bag radially of said coil spring so that said bag assumes a generally cylindrical shape with said side walls having an undulating configuration when said coil spring is in its normal extended condition, the said undulating configuration of said bag side walls comprising alternating nodes and roots, said roots receiving convolutions of said coil spring and said nodes protruding a substantial distance between adjacent convolutions when said coil spring is in its normal extended condition to provide yieldable supporting areas for individual convolutions of said coil spring.

4. A spring suspension unit adapted to extend between two spaced, relatively movable members so as yieldably to maintain said members in spaced relation, said unit comprising a coil spring; a generally cylindrical inflatable bag having elastic side and end walls disposed within said coil springs; and means for inflating said bag with a compressible fluid medium for causing said bag to expand radially and longitudinally, when inflated, so that the end walls are positioned to exert force against said members and said side walls assume an undulating configuration when said coil spring is in its normal extended condition, the said undulating configuration of said bag side walls comprising alternating nodes and roots, said roots receiving convolutions of said coil spring and said nodes protruding a substantial distance between adjacent convolutions when said coil spring is in its normal extended condition, to provide yieldable supporting areas for individual convolutions of said coil spring.

5. A spring suspension unit comprising a pair of spaced, relatively movable members; a coil spring interposed between said members for yieldably maintaining said members in spaced relation; an inflatable generally cylindrical bag having elastic side walls disposed within said coil spring; and means for inflating said bag with a fluid medium, said bag, when inflated, having parts of its side walls expanded radially to protrude a substantial distance between convolutions of said coil spring in all conditions of loading of said spring, said protruding portions of said side walls providing yieldable supporting areas for said convolutions.

6. A spring suspension unit comprising a pair of spaced, relatively movable members; a coil spring interposed between said members for yieldably maintaining said members in spaced relation; an inflatable, generally cylindrical bag having elastic side and end walls disposed within said coil spring; and means for inflating said bag with a fluid medium, said bag, when inflated, having its side and end walls expanded longitudinally of said coil spring so as to have the end walls exert force on said members and having parts of its side walls expanded radially to protrude a substantial distance between convolutions of said coil spring in all conditions of loading of said spring, said protruding portions of said side walls providing yieldable supporting areas for said convolutions and cooperating with the force exerted by said end walls on said members to resist axial compression of said coil spring.

References Cited in the file of this patent

UNITED STATES PATENTS

| | | |
|---|---|---|
| 1,089,974 | Scott | Mar. 10, 1914 |
| 1,479,282 | Burns | Jan. 1, 1924 |
| 2,361,575 | Thompson | Oct. 31, 1944 |
| 2,391,120 | Berthelmann | Dec. 18, 1945 |

FOREIGN PATENTS

| | | |
|---|---|---|
| 651,823 | France | Oct. 15, 1928 |